(12) United States Patent
Granger

(10) Patent No.: US 11,869,175 B2
(45) Date of Patent: *Jan. 9, 2024

(54) PERCEPTUALLY ACCURATE IMAGE RENDERING

(71) Applicant: Edward M. Granger, Novato, CA (US)

(72) Inventor: Edward M. Granger, Novato, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/837,275

(22) Filed: Jun. 10, 2022

(65) Prior Publication Data

US 2022/0309630 A1    Sep. 29, 2022

Related U.S. Application Data

(63) Continuation of application No. 17/495,972, filed on Oct. 7, 2021, now Pat. No. 11,361,413, which is a
(Continued)

(51) Int. Cl.
*H04N 1/60* (2006.01)
*G06T 5/00* (2006.01)
(Continued)

(52) U.S. Cl.
CPC .......... *G06T 5/009* (2013.01); *G06T 5/003* (2013.01); *G06T 5/50* (2013.01); *G06T 7/90* (2017.01); *H04N 1/603* (2013.01); *H04N 1/6005* (2013.01); *H04N 1/6016* (2013.01); *H04N 1/6058* (2013.01)

(58) Field of Classification Search
CPC .......... G06T 5/009; G06T 7/90; G06T 5/003; G06T 5/50; H04N 1/6005; H04N 1/6016; H04N 1/603; H04N 1/6058; H04N 1/60; H04N 1/648; G09G 5/02; G09G 2340/06
See application file for complete search history.

(56) References Cited

U.S. PATENT DOCUMENTS 8,319,790 B2    11/2012    Ho et al.
9,961,237 B2 *  5/2018    Atkins ............... G09G 5/10
(Continued)

OTHER PUBLICATIONS

Rodriquez, Kari, "International Search Report and Written Opinion Received for PCT Application Serial No. PCT/US2021/051780", dated Dec. 23, 2021, p. 16, Published in: US.
(Continued)

*Primary Examiner* — Antonio A Caschera
(74) *Attorney, Agent, or Firm* — Neugeboren O'Dowd PC

(57) ABSTRACT

An image reproduction system and methods for providing colorant data to an end device. A method includes extracting general HSV value data for each pixel of an image from image data. For each pixel, the general HSV value data is transformed to generate universal perceived brightness, Bp, and universal perceived chroma, Cp, value data. End-device colorant data associated with the general HSV value data is retrieved for each pixel and scaled using the Bp and Cp value data to obtain scaled end-device colorant data. The scaled end-device colorant data is transmitted to the end device.

13 Claims, 12 Drawing Sheets
(5 of 12 Drawing Sheet(s) Filed in Color)

Related U.S. Application Data continuation of application No. 17/483,203, filed on Sep. 23, 2021, now Pat. No. 11,283,967.

(60) Provisional application No. 63/082,656, filed on Sep. 24, 2020.

(51) Int. Cl.
  *G06T 7/90* (2017.01)
  *G06T 5/50* (2006.01)

(56) References Cited

U.S. PATENT DOCUMENTS

| | | | |
|---|---|---|---|
| 11,283,967 B1* | 3/2022 | Granger | G06T 5/50 |
| 11,361,413 B2* | 6/2022 | Granger | G06T 5/50 |
| 2006/0164662 A1 | 7/2006 | Tin | |
| 2009/0022395 A1 | 1/2009 | Cho et al. | |
| 2009/0040564 A1 | 2/2009 | Granger | |
| 2011/0157212 A1 | 6/2011 | Zhang et al. | |
| 2012/0308133 A1 | 12/2012 | Kim et al. | |
| 2016/0005349 A1 | 1/2016 | Atkins et al. | |
| 2016/0323556 A1 | 11/2016 | Luginbuhl et al. | |
| 2018/0013927 A1 | 1/2018 | Atkins | |
| 2022/0092750 A1 | 3/2022 | Granger | |
| 2022/0094813 A1 | 3/2022 | Granger | |

OTHER PUBLICATIONS

Caschera, Antonio, "Office Action Issued in U.S. Appl. No. 17/495,972", dated Jan. 11, 2022, p. 20, Published in: US.

Cashera, Antonio A., "Office Action Regarding U.S. Appl. No. 17/483,203", dated Nov. 22, 2021, p. 7, Published in: US.

O'Dowd, Sean R., "Response to Office Action Regading U.S. Appl. No. 17/483,203", dated Dec. 21, 2021, p. 6, Published in: US.

Granger, Edward, "U.S. Appl. No. 17/483,203, filed Sep. 23, 2021", dated Sep. 23, 2021, p. 36, Published in: US.

* cited by examiner

PERCEPTUALLY ACCURATE IMAGE RENDERING

CLAIM OF PRIORITY UNDER 35 U.S.C. § 119

The present Application for Patent is a Continuation Application of U.S. patent application Ser. No. 17/495,972 entitled "IMAGE TRANSFORMATION SYSTEM AND METHOD" filed Oct. 7, 2021, which is a continuation of U.S. patent application Ser. No. 17/483,203 filed Sep. 23, 2021, U.S. Pat. No. 11,283,967, issued Mar. 22, 2022, and entitled "IMAGE TRANSFORMATION SYSTEM AND METHOD" which claims priority to Provisional Application No. 63/082,656 entitled "IMAGE TRANSFORMATION SYSTEM AND METHOD" filed Sep. 24, 2020, and assigned to the assignee hereof and hereby expressly incorporated by reference herein.

BACKGROUND

Field

The present embodiments relate generally to image reproduction and rendering, and more specifically to image transformations for image reproduction and rendering.

Background

Present invention relates to color and brightness modeling transformations for perceptually accurate image rendering. The problem started at the origins of color TV where Otto Schade compensated for the nonlinearity of the CRT by transforming the transmitted signal. This worked well in an environment where computers were not available. The nonlinearity of the CRT converted the transmitted signal back to the original linear RGB values.

Color rendering technologies continue to evolve. Technologies such as color displays, color printing, scanning, and publishing. For example, an individual may now capture or create a color image with a digital camera, a scanner, or using computer software such as Adobe Photoshop. Computer software such as Adobe Photoshop may manipulate the image and print resulted product as the image is displayed on a computer display screen or other user interface it has become desirable for the resulting printed image to be perceptually accurate match to the displayed image.

Typically, each pixel of the displayed image is specified utilizing additive primaries of red green and blue collectively referred to as RGB or subtractive primaries referred to as CMYK. The primary values combine in a specified combination to result in a display of the selected color. An additive example is using red combined with green to produce a yellow. A subtractive example is using yellow combined with magenta to produce red.

The prior art documents numerous attempts and systems to provide accurate color rendering. There are many attempts to define a color space that specifies a color as perceived by a standard observer. Color spaces use standardized tristimulus values, such as the CIEXYZ color space, the CIE Lab space, and Munsell. These standard specifications are available and utilized by those skilled in a color management or rendering Arts and Sciences terms of its hue, saturation, and brightness (HSB).

The prior art also documents numerous attempts in systems to provide accurate color rendering, typically defining a color space which may be utilized to specify a color. A problem arises when the linear RGB or XYZ color values are further processed to produce new effects like the High Dynamic Range (HDR) transformations. FIGS. 1 and 2 illustrate the problem of nonlinear post processing of the linear RGB input data. FIG. 1 depicts a chromatic test grid, and FIG. 2 depicts the result when the color center grids of FIG. 1 are transformed using a nonlinear 0.45 power law Electro-Optic Transfer Function (EOTF) that is used to increase the brightness and dynamic range of a displayed image. More specifically, FIG. 2 illustrates the distortion of the color grids of FIG. 1 caused by the nonlinear EOTF. The use of a singular EOTF to transform the RGB components of an image is a holdover from the original correction methods used by Otto Schade in 1952.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

Some aspects of the present disclosure may be characterized as a method for providing colorant data for reproduction of an image to an end device that includes extracting general HSV value data for each pixel of an image from image data for the image, where H is hue, S is saturation, and V is a brightness color element. The method may also include, for each pixel of the image, transforming the general HSV value data to generate universal perceived brightness, Bp, and universal perceived-chroma, Cp, value data for the pixel, retrieving end-device colorant data associated with the general HSV value data for the pixel, and scaling the end-device colorant data using the Bp and Cp value data to obtain scaled end-device colorant data. The method may also include transmitting the scaled end-device colorant data to the end device.

Other aspects of the present disclosure may be characterized as a non-transitory processor-readable medium storing executable instructions to provide colorant data for reproduction of an image to an end device, the instructions including instructions for extracting general HSV value data for each pixel of an image from image data, where H is hue, S is saturation, and V is a brightness color element. The instructions may also include instructions for, for each pixel of the image, transforming the general HSV value data to generate universal perceived brightness, Bp, and universal perceived-chroma, Cp, value data for the pixel, retrieving end-device colorant data associated with the general HSV value data for the pixel, and scaling the end-device colorant data using the Bp and Cp value data to obtain scaled end-device colorant data. The instructions may also include instructions for transmitting the scaled end-device colorant data to the end device.

Other aspects of the present disclosure may be characterized as an image reproduction system that includes an end device, a datastore configured to store an end-device calibration array containing colorant data for a plurality of hue and saturation values, and a linear extraction module configured to extract general HSV values from image data for an image, where H is hue, S is saturation, and V is a brightness color element. The image reproduction system may also include a multidimensional EOTF module configured, for each pixel of the image data, to use the general HSV values to determine universal perceived brightness, Bp, and universal perceived-chroma, Cp, values for the pixel, apply a transform to any of H, Bp, and Cp, and scale the colorant data by the Bp and Cp values to obtain scaled colorant data. The end device of the image reproduction system may reproduce the image using the scaled colorant data.

BRIEF DESCRIPTION OF THE DRAWINGS

The application file contains at least one drawing executed in color. Copies of this patent application publication or patent with color drawings will be provided by the Office upon request and payment of the necessary fee.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Aspects described herein provide improved devices and systems utilizing a three-component color space that is operating system neutral and computationally efficient. According to another aspect, a new multidimensional EOTF transformation is described herein that allows for a nonlinear transformation to be used without occurrence of chromatic distortions.

The transformation described herein is based on the interactions of light and scene colorants. Embodiments of the color space offer better arithmetic precision.

Prior art color spaces such as CIEXYZ are structured such that the much of the vector space is not used to render a real-world image. This requires using more bits of computational precision in CIEXYZ just to guarantee 8-bit precision of the rendered images.

A computationally efficient color space (to provide the improved machines disclosed herein), in contrast, is wrapped tightly around the gamut of color that exist in the real world, and may be designed to fit the real-world color gamut ensuring the system is 8-bit friendly, such as by utilizing, for example, sRGB color space.

Other aspects provide a new color management system for image reproduction and rendering. Images are rendered in accordance with the embodiments to appear perceptually accurate rather than merely calorimetrically accurate. For example, an exemplary embodiment provides that an image reproduction by a color reproduction device will be perceived as an accurate reproduction of the image displayed on any other device.

The basis of many aspects is that the concept of an electro optic transfer function (EOTF) is expanded to multidimensions, such as through a barycentric transform, in a way that maintains the hue and chroma of each pixel in the image. The present disclosure considers improved systems and devices that implement algorithms and transforms between specified RGBs and any of the previously published HSL, RSV, and HLS models, as well as any other special case of the generalized models. All general HSV models have defined color spaces that are continuous under all transformations unlike the CIELab color spaces that have no defined color space.

Figure 1:
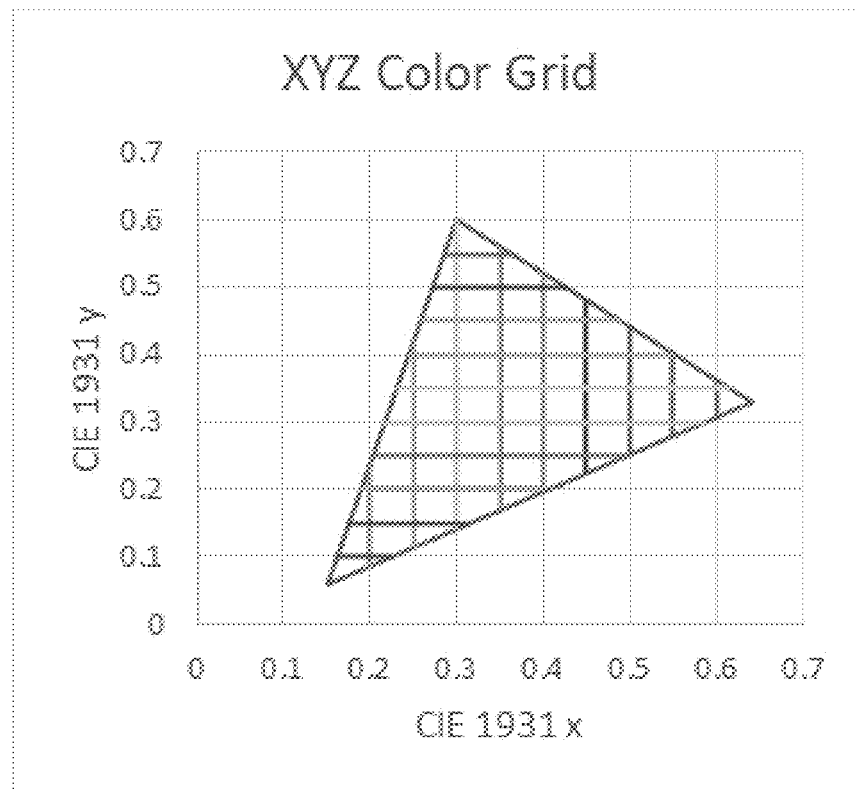
FIG. 1 is a graphical diagram illustrating a chromatic test grid.
Figure 2:
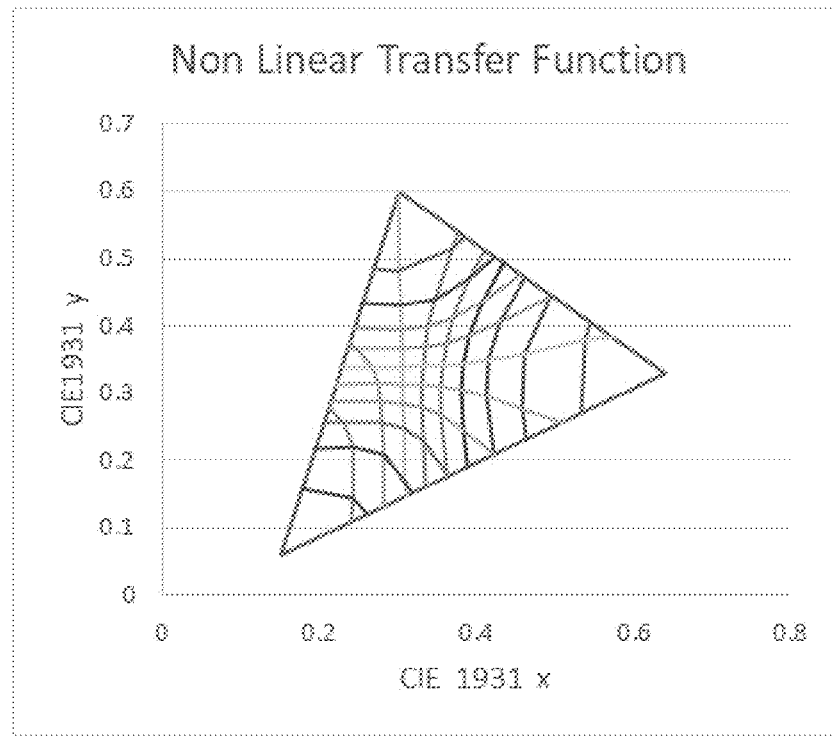
FIG. 2 is a graphical diagram illustrating the distortion of the chromatic test grid when using a nonlinear Electro Optic Transfer Function (EOTF)
Figure 3:
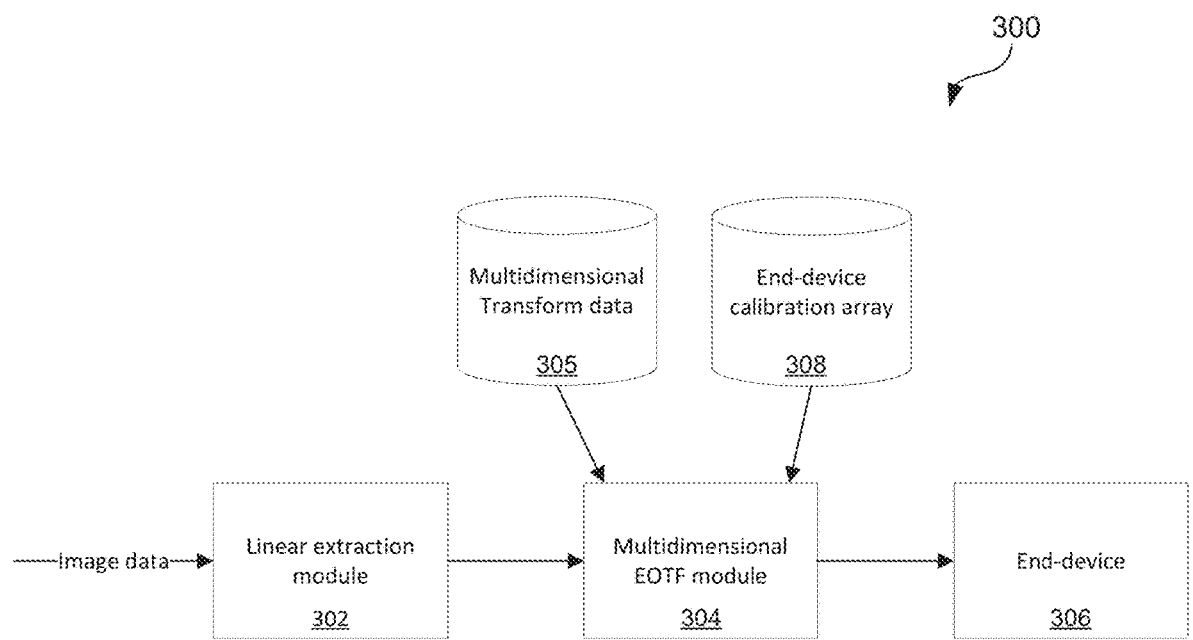
FIG. 3 is a block diagram depicting an exemplary environment in which embodiments may be implemented.
Figure 4:
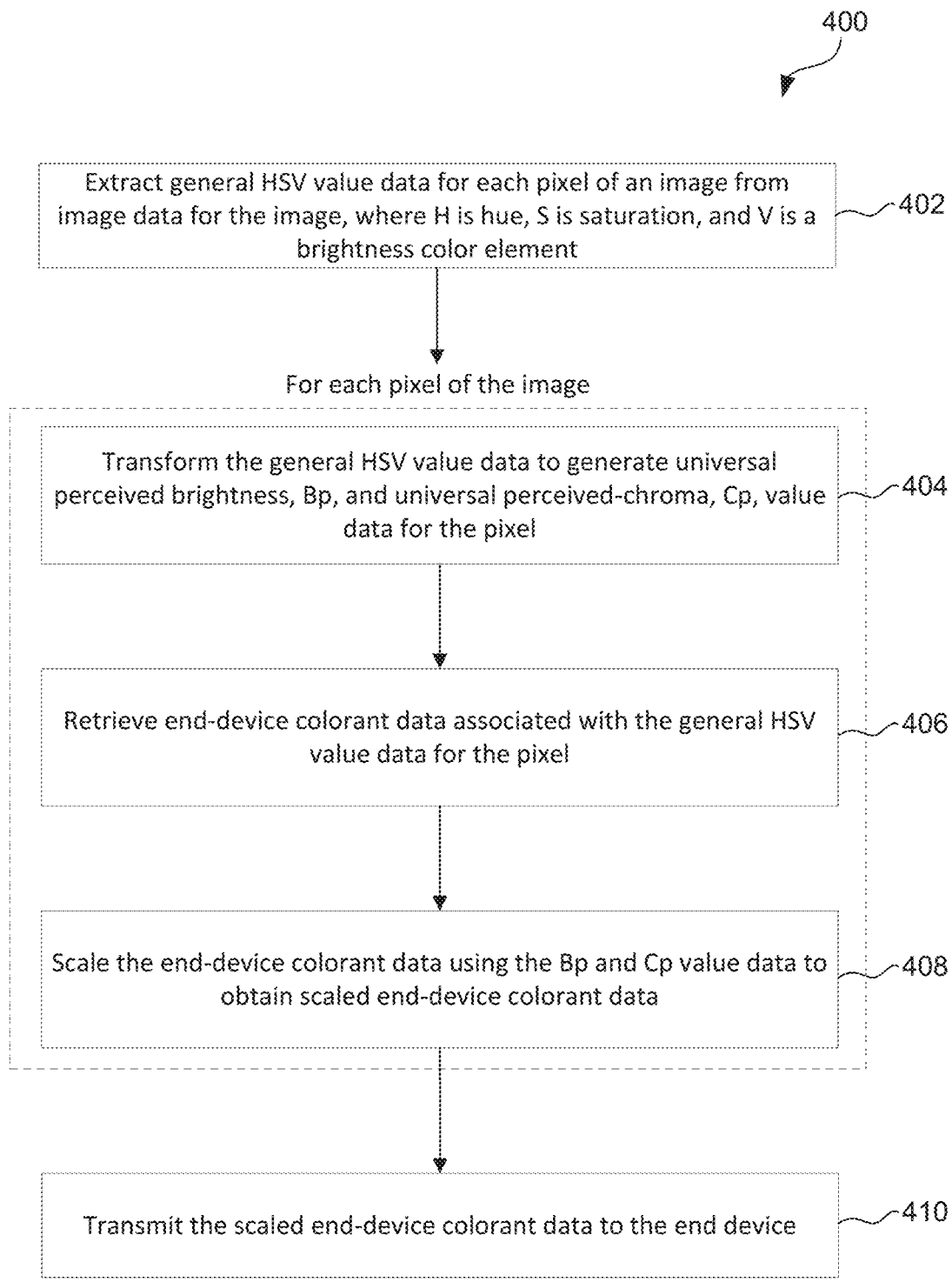
FIG. 4 is a flowchart depicting a method for providing colorant data for reproduction of an image to an end device that may be traversed in connection with embodiments disclosed herein.

Referring to FIG. 3, shown is a block diagram depicting an exemplary environment in which embodiments may be implemented, such as the method 400 of FIG. 4. Shown is an image reproduction system 300 allowing for multidimensional EOTFs comprising a linear extraction module 302, a multidimensional EOTF module 304, and an end device 306. The linear extraction module 302 is configured to read in image data and extract linear, general HSV data values from the image data for each pixel of an image, where H is hue, S is saturation, and V is a lightness or brightness color element of the three-component color space.

It should be recognized that the system depicted in FIG. 3 is logically depicted in terms of functional components, but in implementation, it may be further distributed into additional functional components and/or further consolidated. When implemented, each depicted functional block may be realized by software in connection with hardware, hardware, and/or programmable hardware. Those of ordinary skill in the art will appreciate that central processing units (CPUs) and/or graphics processing units (GPUs) in connection with transitory instructions may be utilized to realize some functional aspects, and field programmable gate arrays (FPGAs) may be programmed to realize other aspects, but these are merely examples. It should also be recognized that all of the components depicted in FIG. 3 may be collocated at a single location and may reside in a common housing. It is also contemplated that the components may be distributed within a common housing or in multiple separate housings. Regardless of whether the components are collocated or remotely distributed, communication between the depicted blocks may occur via known (or yet to be developed) communication channels (e.g., wireline or wireless communication channels).

In operation, the multidimensional EOTF module 304 produces colorant data for the end device 306 by utilizing the general hue, saturation, value (HSV) data values, multidimensional transform data 305, and an end-device calibration array 308. For example, the multidimensional EOTF module 304 may, for each pixel of the image data, use the general HSV data values to determine universal perceived brightness, Bp, and universal perceived-chroma, Cp, values for each pixel. A barycentric transform may be used to determine the Bp and Cp values as disclosed herein, such as in reference to FIGS. 8-13. The multidimensional transform data 305 may be generated by one or more of user selected settings, device-specific transform data, and general transform data.

The multidimensional EOTF module 304 may use the multidimensional transform data 305 to apply a transform, which may be a multidimensional EOTF transform, such as an EOTF transform that affects image sharpness, to any of H, Bp, and Cp for each pixel. The end-device calibration array 308 is configured to provide the multidimensional EOTF module 304 with device-specific colorant data based on hue and saturation values. The image reproduction system 300 may include a datastore (e.g., non-volatile memory) configured to store the end-device calibration array 308, which may contain colorant data for a plurality of hue and saturation values. The multidimensional EOTF module 304 may scale the colorant data stored in the end-device calibration array 308 by the Bp and Cp values to obtain scaled colorant data for each pixel. The end device 306 is then configured to reproduce the image from the scaled colorant data, which may be transmitted to the end device 306 from the multidimensional EOTF module 304. This transmission may be intra-device transmission or inter-device transmission. The end device 306 may be, for example, a printer (e.g., color or black and white printer), a display (e.g., CRT, LCD, OLED or other type of display), a projector, or any other image rendering device. So, an example of intra-device transmission may be an instance where the multidimensional EOTF module 304 and the end device 306 (e.g., display or ink-deposition components) are collocated within a televisional or a printer.

An exemplary HSV color space is QTD. The QTD color space is supported by the sRGB color space, using the sRGB primaries as basis vectors for the QTD color space. QTD offers an improvement of the CIEXYZ 1931 color matching space. Luminance given by the Y vector of CIEXYZ does not correctly report the brightness of colors especially in the blue region of the visual response. QTD corrects for the Helmholz-Kohlrausch effect and maintains brightness as chromatic colors desaturate to gray. The luminance or brightness correction is important to the efficacy of the transforms developed in the patent. In addition, QTD hue correlates with the hue lines of the Munsell Color System over the volume of the Munsell color space.

The QTD color space includes a first vector, Q, that is a brightness vector which differs from the Y vector of CIEXYZ. The brightness vector, Q, corrects for the induced perceptual increase in brightness contributed by the chromatic channels of human vision. The QTD color space also includes a second vector, T, and a third vector, D, that are each associated with particular color opponents, wherein T is associated with red and green hues, and D is associated with yellow and blue hues. The ratio of T and D relate to hue, while the magnitudes of T and D relate to saturation. The T and D color vectors may be approximated as T=R−G (Equation 1) and D=(R+G)/2−B (Equation 2) using the sRGB primaries R (red), G (green), and B (blue). The T−D chromatic plane generated using Equation 1 and Equation 2 appears similar to a color wheel commonly used in art.

Hue angle in the T−D chromatic plane may be calculated using the ratio of T and D. For example, if the magnitude of T is greater than the magnitude of D, the hue angle may be calculated as Hue=$S_1$*abs(D)/abs(T)+$S_2$ (Equation 3), and, if the magnitude of T is not greater than the magnitude of D, the hue angle may be calculated as Hue=$S_1$*abs(T)/abs(D)+$S_2$ (Equation 4) where $S_1$ and $S_2$ are constants that scale the hue angle to have the same scaling as the Munsell color scale. For example, $S_1$ may be 12.5 or −12.5, and $S_2$ may be 0, 25, 50, 75, or 100 depending on the scaling necessary to match the Munsell hue angle.

The brightness vector, Q, is defined as Q=A+K*(abs(T)+abs(D)) (Equation 5) where K is a constant and A is the achromatic channel as defined by the ITU-R BT.709-3 standard as A=0.2125*R+0.7152*G+0.0722*B (Equation 6). Consequently, Q adds in extra perceived brightness contributed by the chromatic opponent channels of color vision to the achromatic brightness, A. The constant, K, may be determined using brightness-lightness ratios, such as in the CIE1931 (x,y) plane, and may, for example, have a value of 0.125. In other embodiments, Q may include constants for each color channel (e.g., red, green, yellow, and blue), for example, rather than a single constant, K, that is used for each color channel.

The perception of the brightness vector, Q, may be assessed, for example, using Weber's Law or the Weber-Fechner Law where the relationship between a linear stimulus (Q) a perception of that stimulus is logarithmic, such as P=k*ln(Q/$Q_0$) (Equation 7) where P is a perception value of the brightness of Q, $Q_0$ is the value of Q at the threshold of perception, and k is a constant. As a result, the change in perception of Q with respect to A, T, and D may be defined as $$\frac{\partial P}{\partial A} = k * \frac{\partial A}{Q}, \quad \text{(Equation 8)}$$

$$\frac{\partial P}{\partial T} = k * 0.125 * \frac{\partial T}{Q}, \text{ and} \quad \text{(Equation 9)}$$

$$\frac{\partial P}{\partial D} = k * 0.125 * \frac{\partial D}{Q} \quad \text{(Equation 10)}$$

where K=0.125 has been used. Equations 8, 9, and 10 may be combined in a Euclidean manner to define a color difference metric as $$\Delta P = k * \frac{\sqrt{\Delta A^2 + (0.125 * \Delta T)^2 + (0.125 * \Delta D)^2}}{Q}. \quad \text{(Equation 11)}$$

MacAdam Ellipse data and Equation 11 may be used to compare the performance of the QDT color space to CIE standards. For example, ellipse data in the region of the ITU-R BT.709-5 standard may be used, and a value of 0.18 may be used for A, which corresponds to a CIE L value of 50. Through such an analysis, the value of k in Equation 11 may be determined to be 65.5 in order to produce a just noticeable difference (JND) value of 1.0 for 20 of the 25 ellipses within the region where a perfect transform would result in a JND=1 for all sample points on the family of ellipses.

A first exemplary test may be used to determine ability to convert ellipses to circles of unit JND where the ratio of maximum JND to minimum JND may be used to measure how well each color difference metric transforms the chosen ellipses with a perfect transformation yielding a maximum JNA to minimum JND ratio of 1.0. A second exemplary test may be used to determine ability to predict the JND for a specific group of chosen ellipses. The maximum JND and minimum JND may be used to compute an average JND for each of the chosen ellipses using each color difference metric. The QDT color space may be shown to outperform CIE Luv, CIE Lab, and CIE DE2000 using such tests.

FIG. 4 depicts a machine-executable (e.g., single or multimachine-implemented) method 400 for providing colorant data for reproduction of an image to an end device that may, for example, be carried out by the image reproduction system 300 of FIG. 3. The method 400 comprises, in Block 402, extracting linear, general HSV value data (e.g., QTD values) for each pixel of an image from image data for the image, where H is hue, S is saturation, and V is a brightness color element. The general HSV value data may, for example, be defined for all RGB primaries. Such extracting may include converting the image data (e.g., QTD values) to an HSV format. For example, when using QTD, hue, H, may be a ratio of T and D, saturation, S, may be a maximum of (|T|, |D|), and the brightness color element, V, may be equal to Q.

The method 400 further comprises, in Block 404, for each pixel of the image, transforming the general HSV value data to generate universal perceived brightness, Bp, and universal perceived-chroma, Cp, value data for the pixel. For example, the HSV formatted image data is converted to a H-Bp-Cp format where Bp is a scalar related to perceived-brightness and Cp is a scalar related to perceived-chroma. Each of Bp and Cp may, for example, be a ratio or percentage of a maximum brightness or chroma, respectively, and may be represented in barycentric coordinates. For example, the transforming of Block 404 may include applying a barycentric transform that maps S to support a Cp value of {0 to 1} for all H and maps V to support a Bp value of {0 to 1} for all S and H. Such a barycentric transform may be configured to map any RGB space to an entire range of H and Cp as is demonstrated in FIGS. 8-13. As one of ordinary skill in the art will appreciated in view of this specification, this transform may be carried out, for example, by a processor (executing processor-executable instructions) in connection with memory.

The method 400 further comprises, in Block 406, for each pixel of the image, retrieving end-device colorant data associated with the general HSV value data for the pixel. For example, the pixel colorant data, given the H, S, and V values, may be obtained from an end-device calibration array, such as the end-device calibration array 308 of FIG. 3 (an example is also described further herein with reference to FIG. 7).

The method 400 further comprises, in Block 408, scaling the end-device colorant data using the Bp and Cp value data to obtain scaled end-device colorant data. For example, a Cp scaling, or shift, may be realized by an index shift of saturation values associated with the end-device colorant data. In another example, a Bp scaling may be realized by a direct multiplication of end-device colorant data values. The method further comprises, in Block 410, transmitting the scaled end-device colorant data to the end device. Such transmitting may, for example, be in the form of a signal containing the scaled end-device colorant data.

In some embodiments, the method 400 may further comprise applying a transform to at least one of H, Bp, and Cp, such as a transform that produces a nonlinear EOTF. For example, the transform may be applied to at least one of Bp and Cp to produce a multidimensional EOTF. Such a transform may, for example, affect the image sharpness (e.g., a sharpening or blurring transform). In another example, the transform may be used to effectuate the perceptual acceleration disclosed herein. Multiple transforms may be applied to each of H, Bp, and Cp. The present disclosure may enable transforms, such as nonlinear transforms, to be implemented without chromatic distortions by maintaining hue and chroma.

In some embodiments, the method 400 may further comprise reproducing the image with the end device, such as the end device 306 of FIG. 3, using the scaled end-device colorant data. For example, the image may be reproduced on an end device that utilizes a subtractive reproduction method that adds neutral colorant, which may, for example, have a value equal to 1−Bp, to produce the scaled end-device colorant data. Further discussion of such end devices is made in reference to FIGS. 6 and 7 herein.

Figure 5:
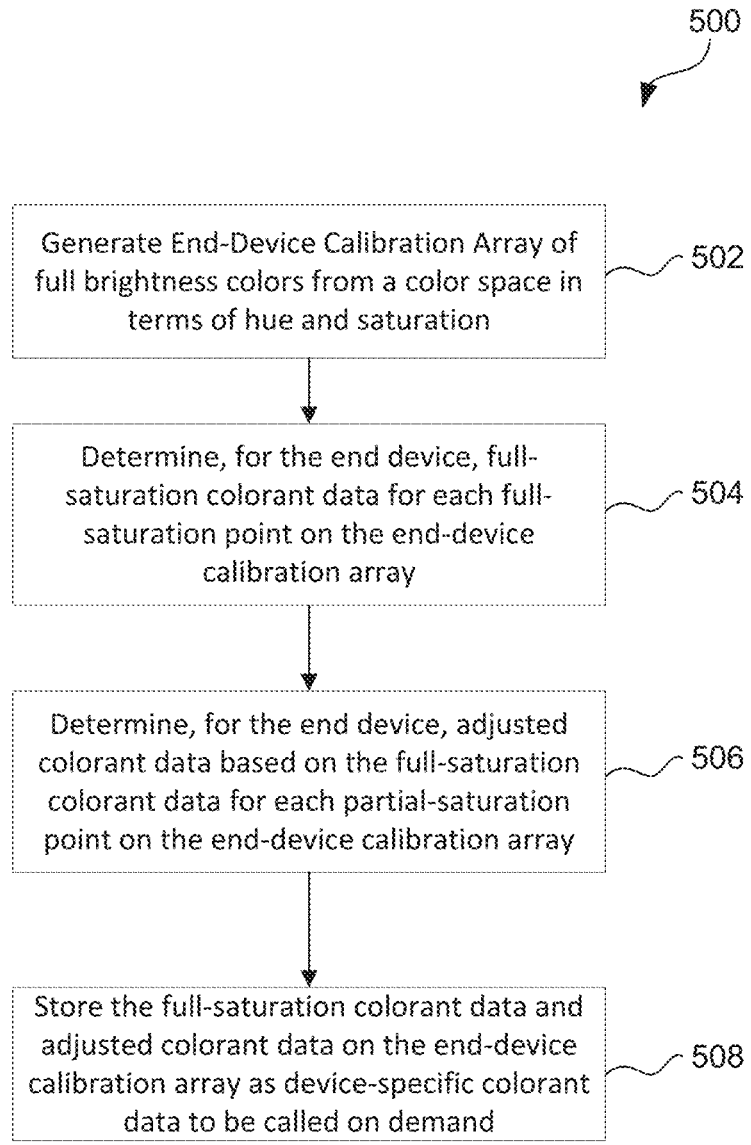
FIG. 5 is a flow chart depicting a process for calibration for an end device.
Figure 8:
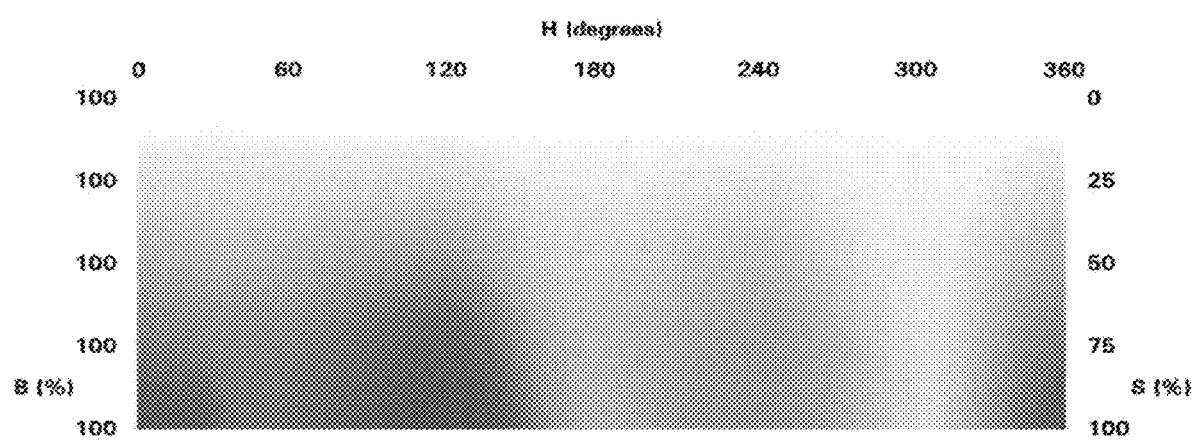
FIG. 8 is an example of a full-brightness color space from which the end-device calibration array may be constructed.

FIG. 5 depicts a method 500 for generating device-specific colorant data on the end-device calibration array, such as the end-device calibration array 308 of image reproduction system 300. The method 500 comprises, in Block 502, generating an end-device calibration array of full brightness colors from a color space in terms of hue and saturation, such as is shown in FIG. 8. The method 500 further comprises, in Block 504, determining, for the end device, full-saturation colorant data for each full-saturation point on the end-device calibration array. The method 500 further comprises, in Block 506, determining, for the end device, adjusted colorant data based on the full-saturation data for each partial saturation point on the end-device calibration array. For example, the full-saturation colorant data may be adjusted to determine adjusted colorant data for each partial-saturation point on the end-device calibration array. The method further comprises, in Block 508, storing the full-saturation colorant data and adjusted colorant data on the end-device calibration array as device-specific colorant data to be called on demand.

For each point in the end-device calibration array, the device-specific colorant data may include information on the amount of each of a plurality of available colorants on the end device 306 to be used in order to reproduce the color at that point, which may be referenced using hue and saturation values. The colorants on the end device may be either additive or subtractive. An exemplary additive end device may be an RGB monitor, whereas an exemplary subtractive device may be a CMYK printer.

Figure 6:
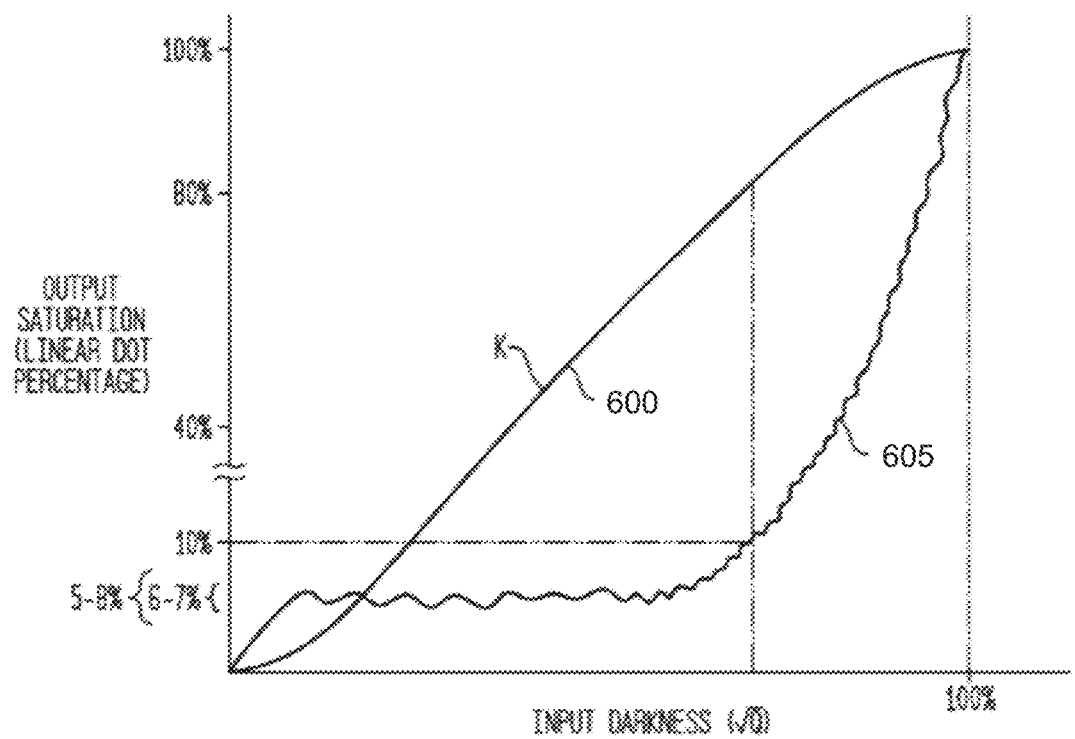
FIG. 6 is a graphical diagram illustrating an exemplary darkness output for black and neutral models.
Figure 7:
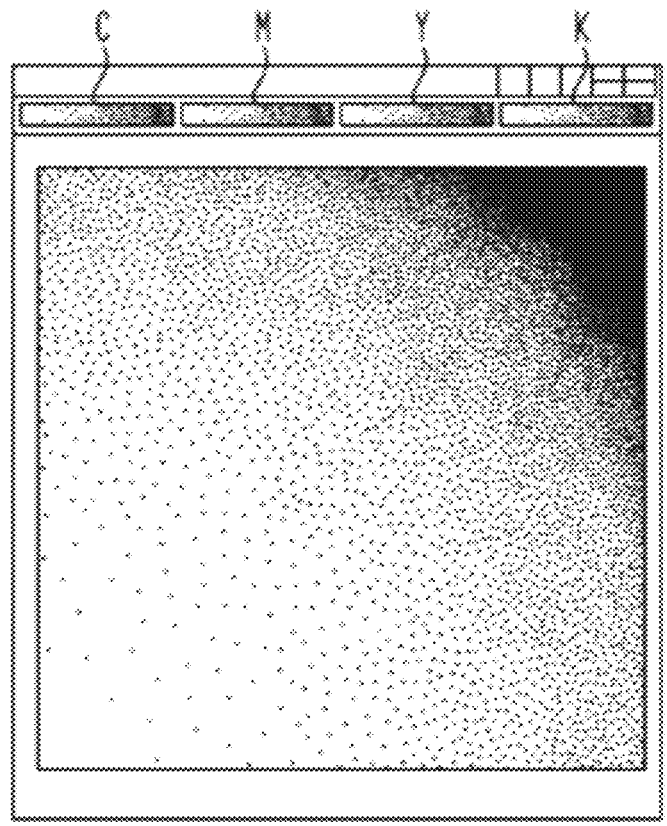
FIG. 7 is a diagram illustrating an exemplary neutral model.

Referring next to FIG. 6 and FIG. 7, described are aspects of calibration in the context of end devices that utilize subtractive coloring such as printers. FIG. 6 is graphical diagram illustrating an exemplary output (as colorant (ink) percentages), where darkness is equal to $1.0-B_p$. FIG. 6 illustrates how black ink combined with cyan, magenta, and yellow (CMY) produces a neutral reduction in brightness. As illustrated, most darkening utilizes a black ink, as illustrated on line 600, and is generally nonlinear for the darkness/brightness model. Black is utilized primarily to create the grays and neutral tones, with comparatively small amounts of cyan, magenta, or yellow utilized to create finer gradations in the gray/neutral scale, essentially creating interpolations between the gray and black levels obtained through the use of black alone. Line 605 graphically illustrates the amounts of colorants (e.g., cyan, magenta, yellow or other primary or secondary colorants) which are then included in selected combinations with the black ink, to produce the final darkened image.

As illustrated, to provide both darkening and neutral tones, small amounts of CMY (or other colorants) are utilized, increasing linearly to a first predetermined level of approximately 6 or 7% (linear dot output), to provide neutral tones and darkening. With increasing input darkness, the CMY output is maintained in the vicinity of 6 or 7%, with significantly increasing amounts of black. The amounts of CMY are "dithered" or oscillated slightly around this 6-7% range, providing additional gradations of neutral tones (and a gray scale with 1020 levels). To provide neutral tones having darkness levels of 10% and higher, CMY amounts are only quadratically (approximately, with some oscillation/dithering) increased above this first level, with the maximum level of CMY selected depending upon the maximum level of colorant usage (output) that may be selected, and may range from approximately 40% to 100% utilized for 100% darkness. In addition, the number of colorants utilized, such as CMY, will vary based on the selected color model. For example, blackness may be achieved utilizing only a black pigment without other colorants or may utilize one or more of the various colorants (such as CMY).

FIG. 7 is diagram illustrating an exemplary neutral model. As illustrated in FIG. 7, the vertical axis defines increasing levels (percentages) of black colorant (ink), while the horizontal axis defines changing CMY values, where each CMY combination maintains gray balance. This results in the exemplary 1020 levels of gray, which are substantially spectrally flat, using all combinations of K and CMY steps in small step increments. In exemplary embodiments, FIG. 7 may be utilized as a target for neutral calibration of the selected output device, following gray (neutral) balancing of the selected output device (i.e., gray balancing to determine the comparative amounts of CMY to provide selected gray, neutral increments).

This neutral and black model is in sharp contrast to other approaches in which neutral and black utilize CMY levels in the ratios of 100:80:80, respectively, at all levels of darkness, which contributes substantially to strong metameric effects (as the prior art neutrals are not substantially spectrally flat). In addition, in accordance with exemplary embodiments, where possible, only 2 of the 3 CMY are utilized for or in the chromatic portion of the image before the addition of a darkness component, to further decrease metameric effects. In addition, this use of small amounts of CMY reduces the need for gray and neutral balancing in commercial printing and graphic arts applications.

When the end device 306 is an additive display, a linear scaling of the maximum saturation colors may be carried out such that at least one of the primaries is at full output at the chromatic limit at the edge of the sRGB color space.

Referring next to FIG. 8, shown is an exemplary full-brightness color space from which the points on the end-device calibration array may be selected where B represents brightness, S represents saturation, and H represents hue angle. This color space may be used to define, for example, the full-brightness color space along the surface of the upper cone shown in FIGS. 9A and 9B.

Figure 9A:
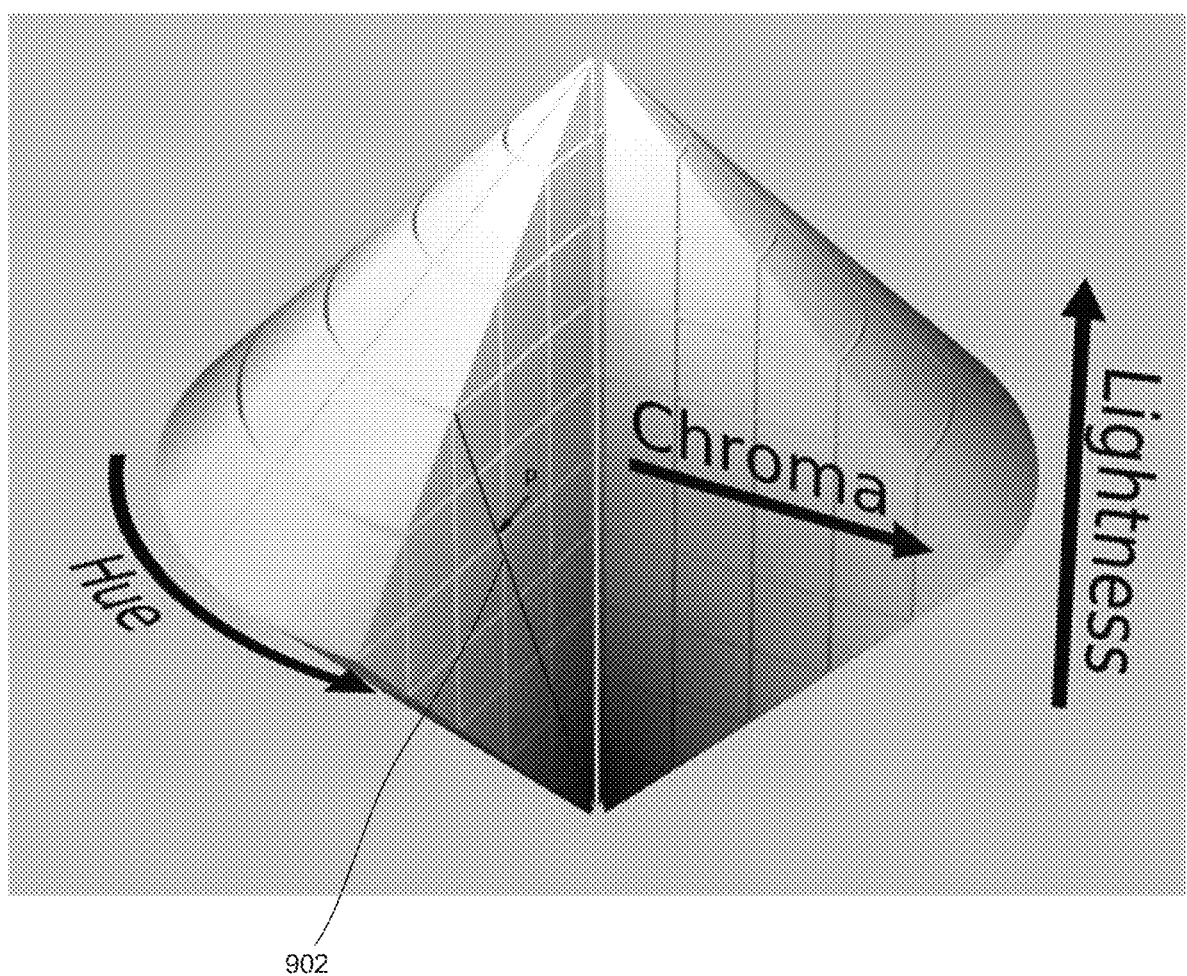
FIG. 9A is a color graphical depiction of a color space utilized to describe aspects of a novel multidimensional transform.
Figure 9B:
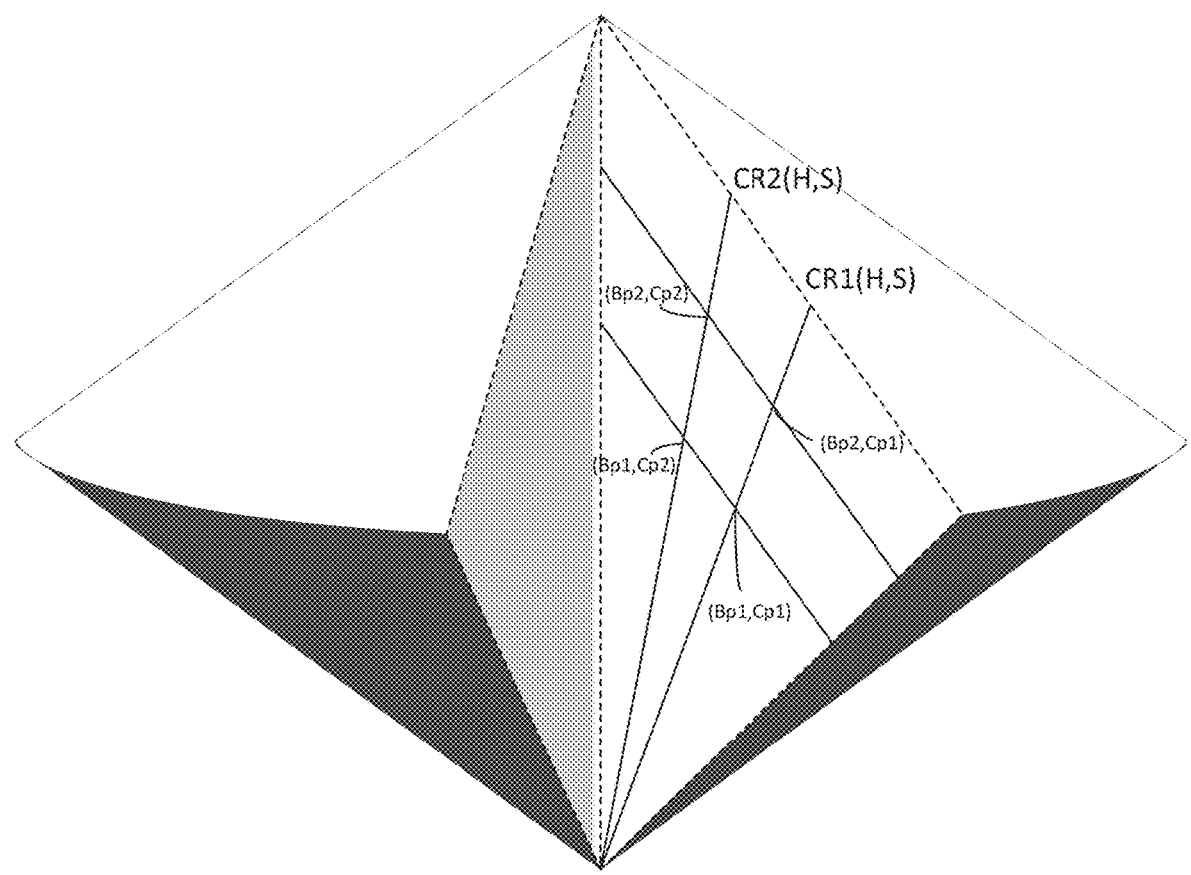
FIG. 9B is a graphical depiction of a color space utilized to describe aspects of a novel multidimensional transform.

FIG. 9A and FIG. 9B illustrate how the method of FIG. 4 may transform color points for a particular color space. The representation shown in both FIGS. 9A and 9B depicts a three-dimensional color space that forms a double conical shape wherein the surface of the upper cone is the full-brightness color space from which the end-device calibration array was selected. The top vertex of the double cone represents the white point, and the bottom vertex represents the black point with lightness, or brightness, scaling in between. Points around the ring represent full-saturation, or chroma, colors and rotating around the ring alters the hue. The dashed lines of FIG. 9B indicate a portion of the double cone that has been cut on a plane of constant hue so the interior may be shown, as in FIG. 9A.

FIG. 9A shows a model of a constant hue slice of an HSV color space, the yellow-green constant hue slice containing the line 902. The space between the upper and lower cone represents the volume of all colors as they go from maximum brightness to black. The line 902 depicts a path of constant perceived saturation, or brightness-saturation path, as brightness is reduced from full brightness to black in the hue slice. Many embodiments of the present disclosure allow the definition of a different EOTF function along such a path for each point on the upper cone as the colors go from full brightness to black. The brightness-saturation path shown in FIG. 9A may be represented using the barycentric interpolation method shown in FIG. 10, for example.

Referring to FIG. 9B, coordinates in the color space along a hue slice are labelled by Bp1, Cp1, Bp2, Cp2, wherein Cp1 and Cp2 represent specific shifts in the perceived-chroma and Bp1, Bp2 represent specific perceived-brightness levels. CR1(H,S) and CR2(H,S) represent an arbitrary hue and saturation (H,S) coordinate of the end-device calibration array, CR(H,S), such as shown in FIG. 8, that has been shifted, or scaled, by Cp1 and Cp2 respectively. Changes in Bp1 and Bp2, however, indicate scaled values of the device-specific colorant data of the end-device calibration array at a specific perceived-chroma shift.

An aspect of many implementations is the perceived-chroma shift may be realized by an index shift of the saturation values in CR(H,S), and the perceived-brightness scaling may be a direct multiplication of CR(H,S). In this case the output colorant data CRp(H,S) may be determined as: CRp(H,S)=Bp*CR(H,S) (Equation 12).

In some embodiments, an image and corresponding image data may be generated in a graphic arts program, such as Adobe Photoshop, and general HSV value data may be extracted for each pixel of the image. Such general HSV value data may, for example, fall within the exemplary color space depicted in FIGS. 9A and 9B. The general HSV value data may be transformed, such as using a transformation into barycentric coordinates, to generate universal perceived brightness, Bp, and universal perceived-chroma, Cp, data for each pixel. End-device colorant data associated with the general HSV value data may be retrieved for each pixel and scaled using the Bp and Cp value data. For example, an end-device calibration array that maps general HSV values to dot area of an ink for printed media may be scaled using the Bp and Cp value data, wherein the dot area data on the end-device calibration array is the end-device colorant data that is scaled. The scaled dot area data may be transmitted to the end-device, a printer in this case, which may reproduce the image using the scaled dot area data for each pixel. The method 400 depicted in FIG. 4 may be traversed to realize such a reproduction of an image generated in a graphic arts program onto printed media. The printer may, for example, be calibrated as an end device by traversing method 500 depicted in FIG. 5.

Figure 10:
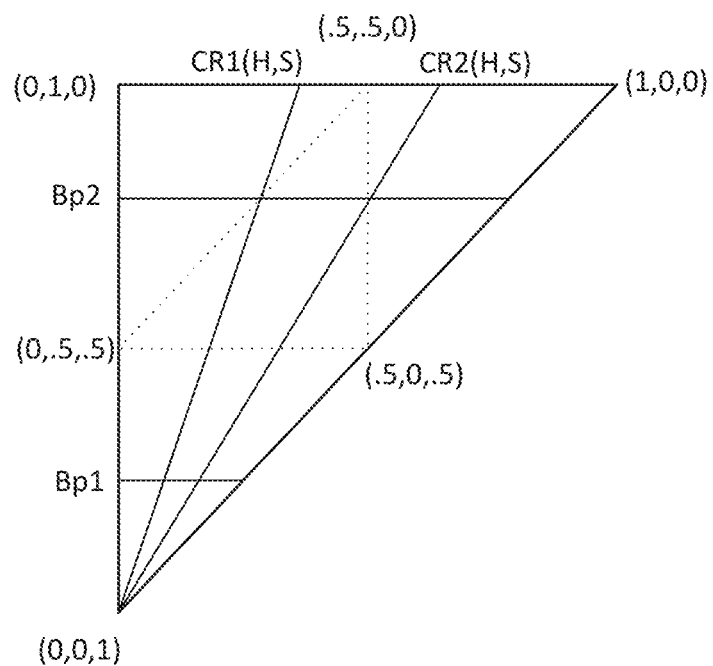
FIG. 10 is a graphical diagram illustrating aspects of the novel multidimensional transform for a hue slice of the color space.

FIG. 10 demonstrates a three-point barycentric coordinate representation for a hue slice of a color space, such as the color space of FIGS. 9A and 9B. The barycentric conversion creates an isomorph which is a superset of all general HSV descriptions. The conversion also creates a "translator" module from which all existing HSV forms can exchange data with other HSV forms. Consequently, the barycentric conversion may generate universal brightness and saturation data, such as universal perceived brightness (Bp) and universal perceived-chroma (Cp) data, in that the universal brightness and saturation data may be universally applied to all general HSV descriptions. The barycentric conversion also enables nonlinear transforms of Bp to produce brightness changes without modifying the perceived-chroma. In general, the barycentric conversion enables an EOTF that is expanded to multidimensions in a way that maintains hue and chroma. In this representation (1,0,0) is the white point, (0,1,0) is the full-saturation and full-brightness edge color of the hue, and (0,0,1) is the black point. In order to determine the barycentric coordinates for a specific saturation and brightness coordinate, point "m," in a hue slice, (Sm,Vm), the following matrix may be defined;

$$M = \begin{bmatrix} 0 & Se \\ 1 & Ve \end{bmatrix}$$ (Equation 13)

where (Se, Ve) are the saturation and brightness coordinates of the edge color in the hue slice. Then the barycentric coordinates for the saturation and brightness for pixel may be represented as:

$$\begin{bmatrix} \lambda 1m \\ \lambda 2m \end{bmatrix} = M^{-1} * \begin{bmatrix} Sm \\ Vm \end{bmatrix}$$ (Equation 14)

where $\lambda 1m$, and $\lambda 2m$ are two of the barycentric coordinates and $\lambda 3m=1-\lambda 2m$ (Equation 15) is the third coordinate. Therefore the color (Sm,Vm) may be represented as a coordinate in barycentric space ($\lambda 1m, \lambda 2m$). A full derivation of this may be found below. A method for determining Bp in the barycentric coordinates is then to allow $Bp=\lambda 1m+\lambda 2m$ (Equation 16). Additionally, the saturation, or perceived-chroma, can be represented as $Cp=\lambda 2m/Bp$ (Equation 17).

The barycentric transform separates brightness and chroma enabling brightness maps, gamut mapping, and other nonlinear transforms to be done independently of each other without chromatic distortion. For example, the brightness of a pixel, Bp(x, y), of an image can be modified globally as, $$Bp(x,y)^M = F(Bp(x,y))$$ (Equation 18)

where $Bp(x, y)^M$ is the result of a function, F, operating on Bp(x, y). The function, F, may be a nonlinear operator or a lookup table. F may be applied globally over the image. A number of brightness modifying functions $F_f$ can be rewritten as $F_f(Bp(x_1, y_1))$ to change brightness in different regions of the image.

In a similar fashion, the chroma, or saturation, of a pixel of an image may be gamut mapped in each hue slice by, $$CR(H,S)^M = CR(H,G(S))$$ (Equation 19)

where CR $(H, S)^M$ is the result of a function, G, operating on S(x, y). The function, G, may be a nonlinear operator or a lookup table. In similar fashion, saturation, S, can be rewritten as $G_f(S(x_1, y_1))$ to change saturation in different regions of the image.

Figure 11:
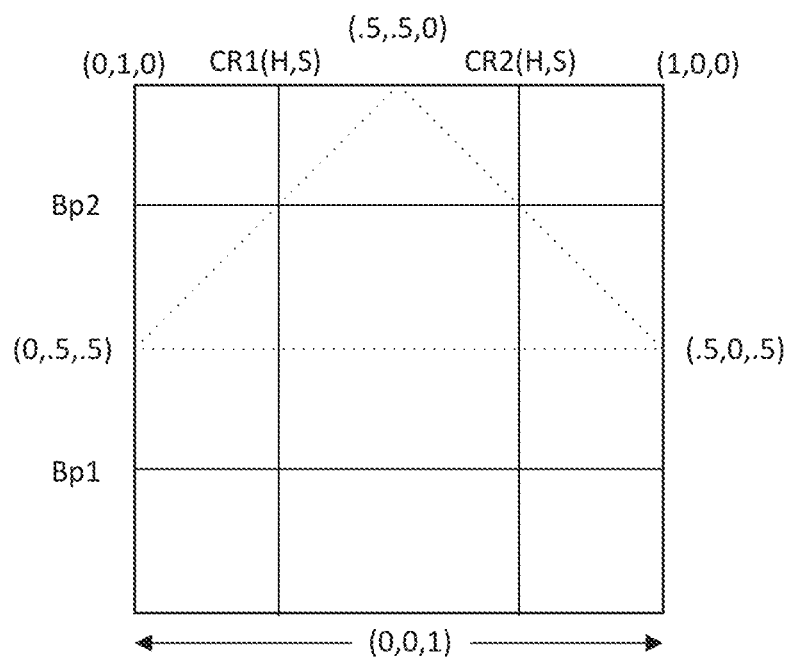
FIG. 11 is a graphical diagram illustrating a variation of the hue slice of FIG. 10 to describe aspects of the novel multidimensional transform.

FIG. 11 shows a representation of FIG. 10 where the black point, (0,0,1), has been stretched to a line. The purpose of this representation is to demonstrate the orthogonality of Bp adjustments to CR(H,S) adjustments. That is, each may be adjusted independently without affecting the other. Brightness maps, F(Bp), and gamut mapping, G(H,S) are also independent. The barycentric conversion treats additive and subtractive reproduction systems with a unifying model.

Figure 12:
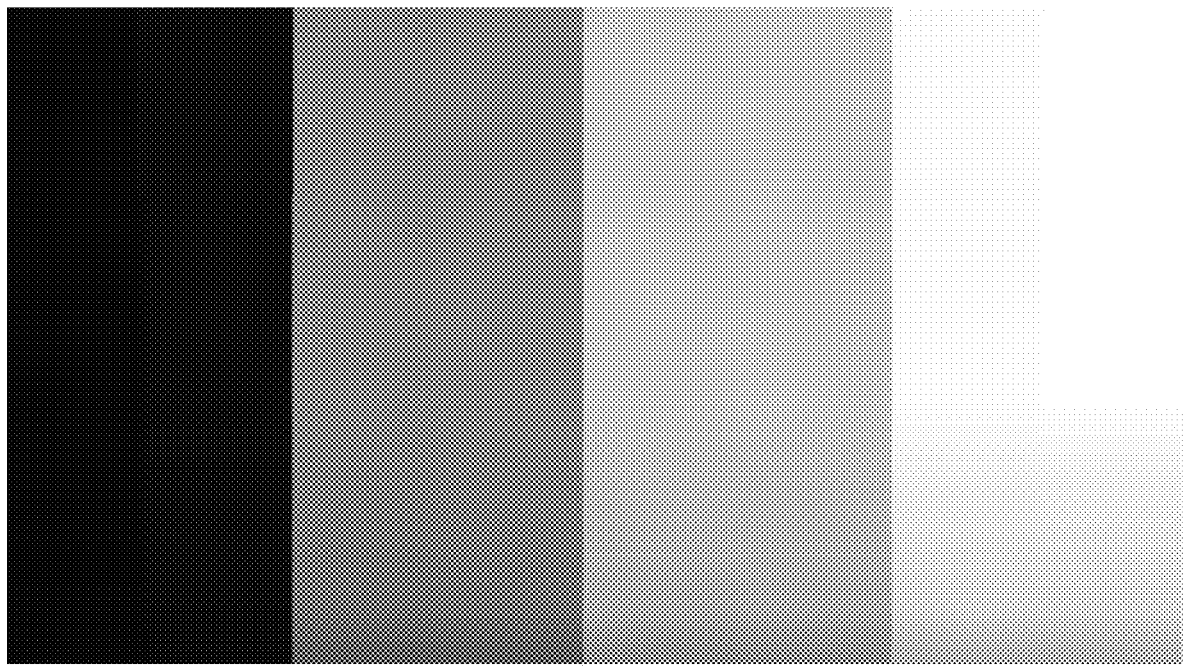
FIG. 12 is an image demonstrating that a number of observable gray levels is not a function of peak luminance.

Many benefits and advantages of embodiments described herein are further apparent when considering the functionality of the human visual system. The human visual system can distinguish approximately 6.6 bits of luminance levels around a level that is 18% of the maximum luminance. The human visual system can also adapt over 6-8 log orders of luminance and sets itself to approximately 18% of the light field range. The peak of the light field range is seen as white and 2% of the peak luminance is seen as black. There is no evidence that the number of observable gray levels is a function of the peak luminance, as is demonstrated by FIG. 12. FIG. 12 depicts ten vertical bars of varying gray levels; however, all ten vertical bars are not visible under any level of brightness. As a result, a high dynamic range (HDR) effect, such as the HDR effect produced by the Dolby perceptual quantization (PQ) EOTF, may be produced using an 8-bit system using a simple transform of linear image data without the need for 12-bit encoding of images or extremely high brightness displays. For example, Dolby PQ EOTF is capable of driving a display range of 0.005 nits to 10,000 nits using a 12-bit system; however, a 10,000-nit display would produce visual black at all levels below 100 nits resulting in half of the useable code bits lost to encoding black. As a consequence, many implementations provide improvements by way of simpler (e.g., less processor-intensive) operations (e.g., simpler encoding and decoding).

Figure 13A:
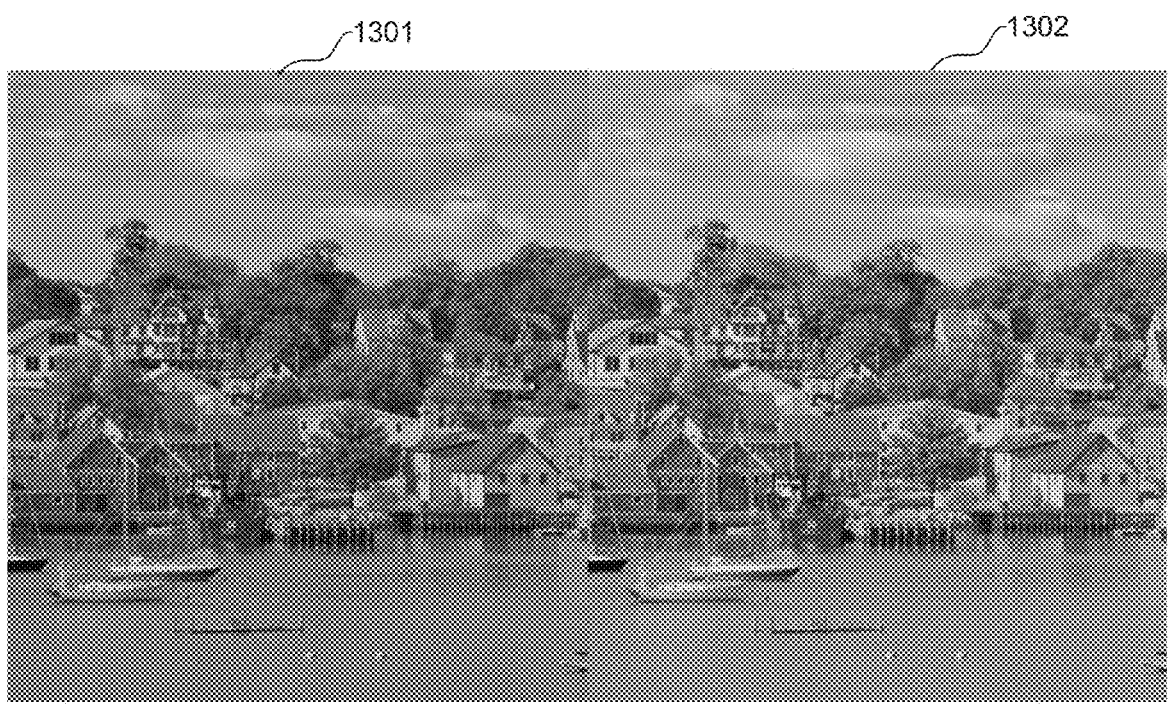
FIG. 13A depicts a pair of images demonstrating the effect of an 8-bit EDR system perceptual acceleration brightness enhancement.
Figure 13B:
FIG. 13B depicts two columns of images for dynamic range comparison of an 8-bit EDR system and a 12-bit Dolby PQ HDR system.

Using the teachings of the present disclosure, an expanded dynamic range (EDR) encoding method for an EOTF that uses a vison based colorimetric space that is linear in brightness and saturation, such as a color space utilizing the barycentric transform as disclosed herein, may be implemented expanding the perception of brightness and saturation. The color gamut of such a EDR encoding is not restricted to a triangular region. For example, 512 primaries may be used to define the gamut with each primary slice providing for infinite brightness and saturation resolution. As a result, 3D interpolation need not be used. Such an EDR encoding may optimize for a particular display EOTF without the need to imitate a CRT EOTF. Additionally, such an EDR encoding enables perceptual acceleration, such as through modifying relevant image data derivatives, that may produce both global and local hue brightness and saturation enhancement as shown in FIG. 13A where an EDR perceptual acceleration brightness enhancement has been used to produce the right image 1302 from the left image 1301. The perceptual acceleration may produce a wide variety of HDR-like image enhancements or other image enhancements without the need for 12-bit images. For example, an 8-bit EDR system may be encoded to closely match the 12-bit Dolby PQ HDR system and have the same dynamic range, as shown in FIG. 13B, while using only ⅔ of the data storage space. FIG. 13B includes a left column of images 1311 that use an 8-bit EDR system and a matching right column of images 1312 that use the 12-bit Dolby PQ HDR system. The dynamic range is the same between the two columns of images. Consequently, the 8-bit EDR system may enable a reduction in code bandwidth used while transferring image data, such as when streaming image data to a home display, without degrading the dynamic range of the images. For example, such an 8-bit EDR system may beneficially reduce the bandwidth to 24 bits in the encoding of a RGB color space.

Figure 14:
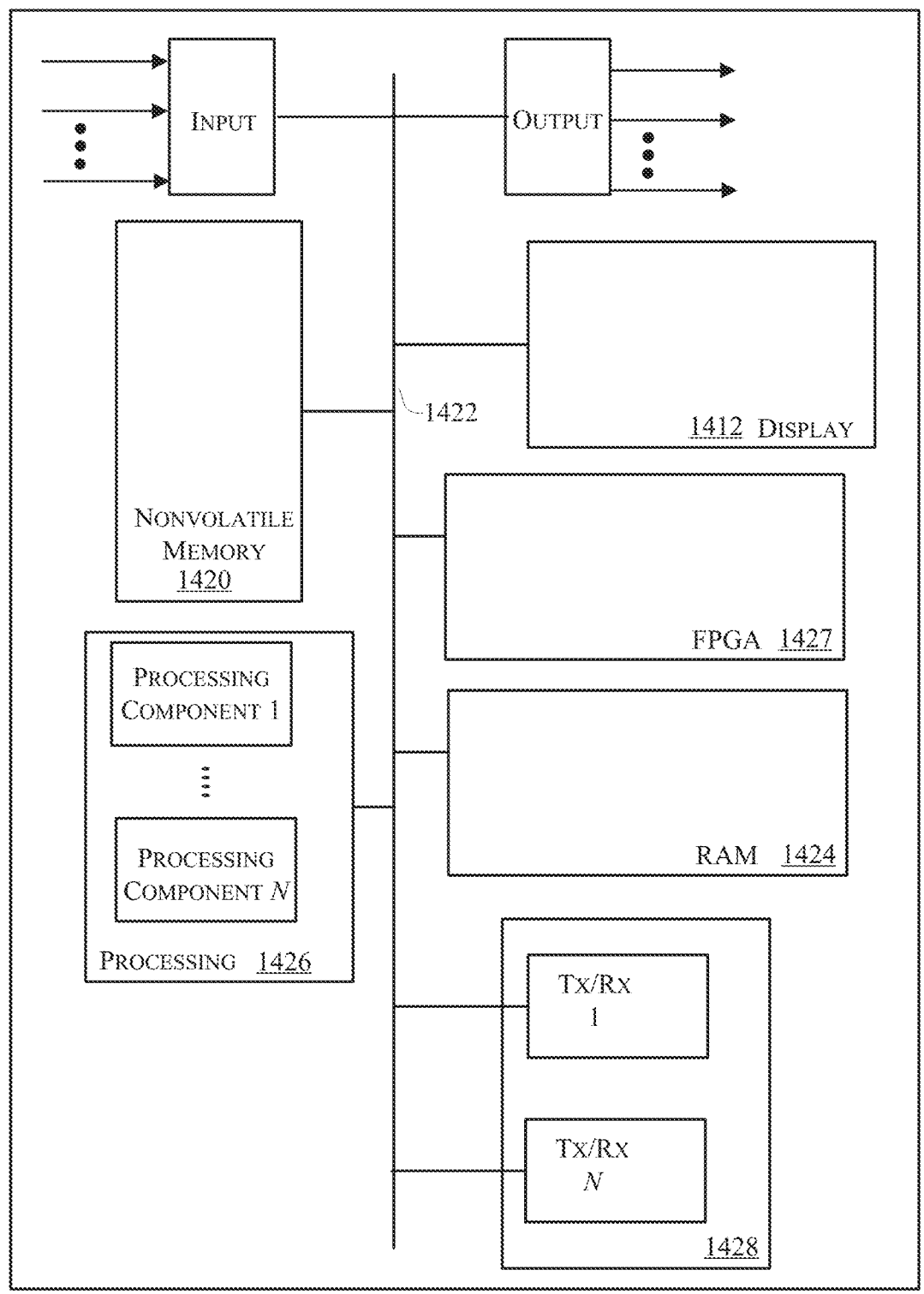
FIG. 14 is a block diagram depicting physical processing related components that may be used to realize aspects described herein.

Aspects of the present disclosure may be embodied directly in hardware, in processor executable instructions encoded in non-transitory machine (e.g., processor) readable medium, or as a combination of the two. Referring to FIG. 14 for example, shown is a block diagram depicting physical components that may be utilized to realize one or more aspects of the linear extraction module, the multidimensional EOTF module, the datastore, and/or the end device according to an illustrative embodiment of this disclosure. As shown, in this embodiment a display 1412 and nonvolatile memory 1420 are coupled to a bus 1422 that is also coupled to random access memory ("RAM") 1424, a processing portion (which includes N processing components) 1426, a field programmable gate array (FPGA) 1427, and a transceiver component 1428 that includes N transceivers. Although the components depicted in FIG. 14 represent physical components, FIG. 14 is not intended to be a detailed hardware diagram; thus, many of the components depicted in FIG. 14 may be realized by common constructs or distributed among additional physical components. Moreover, it is contemplated that other existing and yet-to-be developed physical components and architectures may be utilized to implement the functional components described with reference to FIG. 14.

A display 1412 generally operates to provide a user interface for a user, and in several implementations, the display 1412 is realized by a touchscreen display. For example, display 1412 can be used to control and interact with the multidimensional EOTF module to set Bp, Cp, and/or hue. In implementations where the end device is a printer, the display 1412 may be a display of the printer, or the display may be a display for a printer control system. In other implementations where the end device is a display system, the display 1412 is where the image produce by the multidimensional EOTF module is displayed.

In general, the nonvolatile memory 1420 is non-transitory memory that functions to store (e.g., persistently store) data and machine readable (e.g., processor executable) code (including executable code that is associated with effectuating the methods described herein). In some embodiments, for example, the nonvolatile memory 1420 includes bootloader code, operating system code, file system code, and non-transitory processor-executable code to facilitate the execution of the methods described with reference to FIG. 4 and/or FIG. 5. In addition, nonvolatile memory may be used to store the multidimensional transform data and/or the end-device calibration array described with reference to FIG. 3.

In many implementations, the nonvolatile memory 1420 is realized by flash memory (e.g., NAND or ONENAND memory), but it is contemplated that other memory types may be utilized as well. Although it may be possible to execute the code from the nonvolatile memory 1420, the executable code in the nonvolatile memory is typically loaded into RAM 1424 and executed by one or more of the N processing components in the processing portion 1426.

In operation, the N processing components in connection with RAM 1424 may generally operate to execute the instructions stored in nonvolatile memory 1420 to realize the functionality of the linear extraction module and/or the multidimensional EOTF module. For example, non-transitory processor-executable instructions to effectuate the methods described herein may be persistently stored in nonvolatile memory 1420 and executed by the N processing components in connection with RAM 1424. As one of ordinary skill in the art will appreciate, the processing portion 1426 may include a video processor, digital signal processor (DSP), graphics processing unit (GPU), and other processing components.

In addition, or in the alternative, the field programmable gate array (FPGA) 1427 may be configured to effectuate one or more aspects of the methodologies described herein (e.g., the methods described with reference to FIGS. 4 and 5). For example, non-transitory FPGA-configuration-instructions may be persistently stored in nonvolatile memory 1420 and accessed by the FPGA 1427 (e.g., during boot up) to configure the FPGA 1427 to effectuate the functions of the linear extraction module 302 and/or the multidimensional EOTF module 304.

The input component may operate to receive signals (e.g., user input signals) that are indicative of desired Bp, Cp, and hue settings. When the end device 306 is realized by a printer, the output component may provide one or more analog or digital signals to effectuate ink application to reproduce an image.

The depicted transceiver component 1428 includes N transceiver chains, which may be used for communicating with external devices (e.g., external controllers) via wireless or wireline networks. Each of the N transceiver chains may represent a transceiver associated with a communication scheme (e.g., WiFi or Ethernet). For example, the image data described with reference to FIG. 3 may be received via one or more of the N transceiver chains.

As used herein, the recitation of "at least one of A, B and C" is intended to mean "either A, B, C or any combination of A, B and C." The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

Barycentric Coordinate Conversion

The conversion between barycentric and Cartesian coordinates is given by, $$\begin{bmatrix} x \\ y \end{bmatrix} = \begin{bmatrix} x1 & x2 & x3 \\ y1 & y2 & y3 \end{bmatrix} * \begin{bmatrix} \lambda 1 \\ \lambda 2 \\ \lambda 3 \end{bmatrix} \qquad \text{(Equation 20)}$$

Where (x1, y1), (x2, y2), and (x3, y3) are the Cartesian coordinates of the triangle that contains the point (x, y) and λ1, λ2, λ3 are the barycentric coordinates. The barycentric coordinates weight the Cartesian coordinates of the vertices of the supporting triangle, with the weights of the barycentric transformation summing to unity.

$$\lambda 1 + \lambda 2 + \lambda 3 = 1 \qquad \text{(Equation 21)}$$

To find the reverse transformation λ3 can be replaced by, $$\lambda 3 = 1 - \lambda 1 - \lambda 2 \qquad \text{(Equation 22)}$$

And Equation 20 can be rewritten as, $$\begin{bmatrix} x-x3 \\ y-y3 \end{bmatrix} = \begin{bmatrix} x1-x3 & x2-x3 \\ y1-y3 & y2-y3 \end{bmatrix} * \begin{bmatrix} \lambda 1 \\ \lambda 2 \end{bmatrix}$$ (Equation 23)

Define a 2×2 matrix, M, as $$M = \begin{bmatrix} x1-x3 & x2-x3 \\ y1-y3 & y2-y3 \end{bmatrix}$$ (Equation 24)

Now the matrix given in Equation 20 is invertible and (λ1, λ2) are found by, $$\begin{bmatrix} \lambda 1 \\ \lambda 2 \end{bmatrix} = M^{-1} * \begin{bmatrix} x-x3 \\ y-y3 \end{bmatrix}$$ (Equation 25)

And λ3 is found using Equation 22.

What is claimed is:

1. A method for calibrating an end-device for processing an image, the method comprising:
    generating an end-device calibration array of full brightness colors from a color space in terms of hue and saturation;
    determining full-saturation colorant data for each full-saturation point on the end-device calibration array;
    determining adjusted colorant data based on the full-saturation colorant data for each partial-saturation point on the end-device calibration array; and
    storing the full-saturation colorant data and adjusted colorant data on the end-device calibration array as device-specific colorant data to be called on demand when processing an image on the device.

2. The method of claim 1 wherein the end-device utilizes subtractive color, and the adjusted colorant data is determined by adding black ink with small amounts of cyan, magenta, and or yellow ink.

3. The method of claim 1 wherein only two of the cyan, magenta, and yellow inks are utilized for a chromatic portion of the image before an addition of a darkness component.

4. The method of claim 1 wherein the end-device utilizes additive color, and the adjusted colorant data is determined by linearly scaling maximum saturation colors, such that at least one of a primary color is at full output at a chromatic limit at an edge of a sRGB color space.

5. A color management system for displaying an image comprising:
    a datastore containing colorant data for a plurality of hue and saturation values;
    a linear extraction module configured to extract general HSV values from image data for an image, where H is hue, S is saturation, and V is a brightness color element; and
    a multidimensional EOTF module configured, for each pixel of the image data, to:
        use the general HSV values to determine universal perceived brightness, Bp, and universal perceived-chroma, Cp, values for the pixel;
        apply a transform to any of H, Bp, and Cp; and
        scale the colorant data by the Bp and Cp values to obtain scaled colorant data;
    wherein the image is displayed using the scaled colorant data for each pixel.

6. The color management system of claim 5 wherein the multidimensional EOTF module generates Bp and Cp values using a using a barycentric coordinate transform.

7. The color management system of claim 5 wherein the image is displayed on an end-device and the colorant data is a function of the end-device.

8. The color management system of claim 7 wherein the end-device is a display.

9. The color management system of claim 7 wherein the end-device is a printer.

10. A non-transitory processor-readable medium storing executable instructions to provide a method for calibrating an end-device for processing an image, the instructions comprising instructions for:
    generating an end-device calibration array of full brightness colors from a color space in terms of hue and saturation;
    determining full-saturation colorant data for each full-saturation point on the end-device calibration array;
    determining adjusted colorant data based on the full-saturation colorant data for each partial-saturation point on the end-device calibration array; and
    storing the full-saturation colorant data and adjusted colorant data on the end-device calibration array as device-specific colorant data to be called on demand when processing an image on the device.

11. The non-transitory processor-readable medium of claim 10 wherein the end-device utilizes subtractive color, and the adjusted colorant data is determined by adding black ink with small amounts of cyan, magenta, and or yellow ink.

12. The non-transitory processor-readable medium of claim 10 wherein only two of the cyan, magenta, and yellow inks are utilized for a chromatic portion of the image before an addition of a darkness component.

13. The non-transitory processor-readable medium of claim 10 wherein the end-device utilizes additive color, and the adjusted colorant data is determined by linearly scaling maximum saturation colors, such that at least one of a primary color is at full output at a chromatic limit at an edge of a sRGB color space.

* * * * *